May 8, 1951 J. E. FLOOD ET AL 2,551,935
ELECTRICAL ATTACHMENT PLUG
Filed April 24, 1947
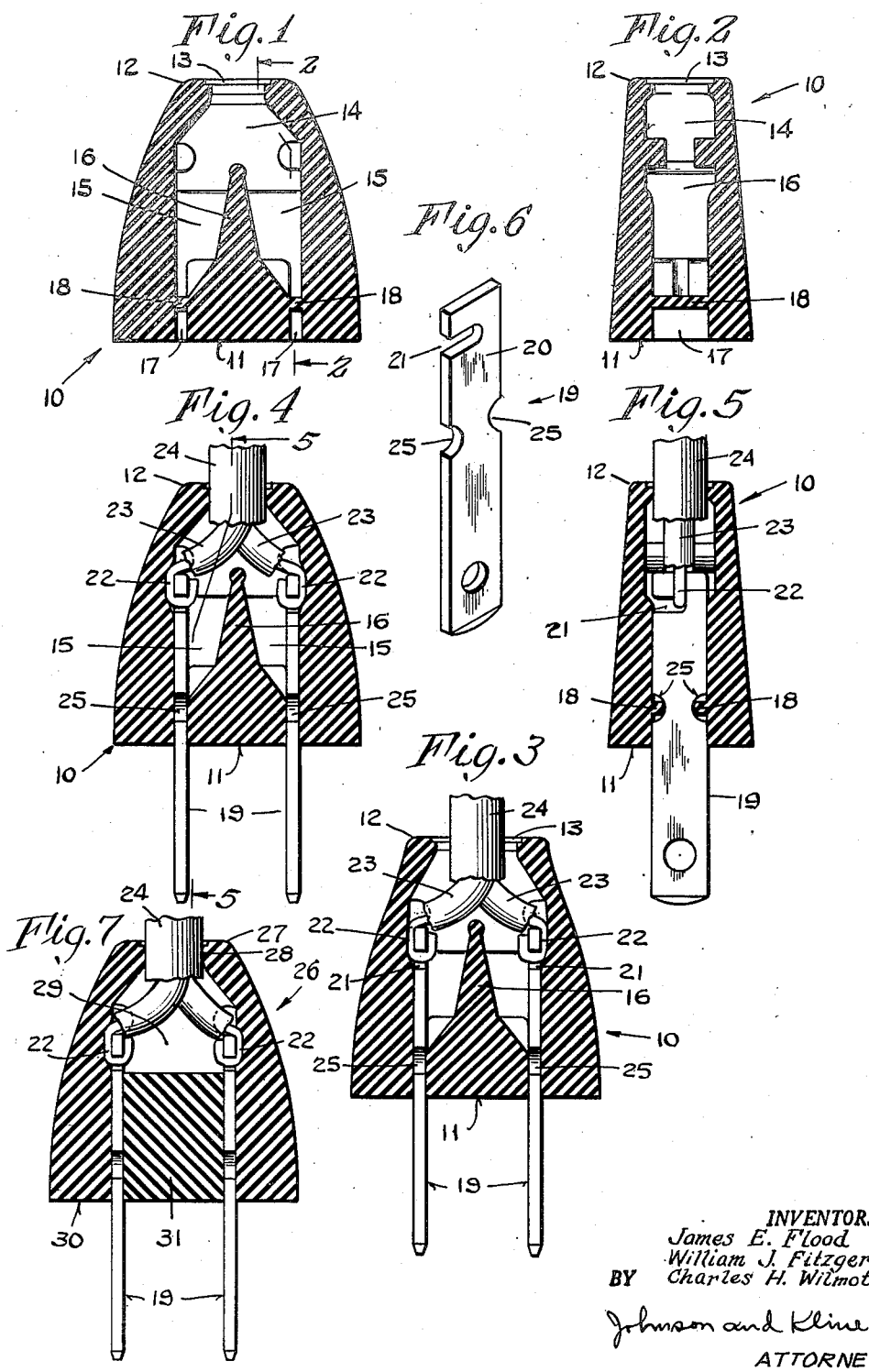
INVENTORS
James E. Flood
William J. Fitzgerald
BY Charles H. Wilmot
Johnson and Kline
ATTORNEYS

Patented May 8, 1951

2,551,935

UNITED STATES PATENT OFFICE 2,551,935

ELECTRICAL ATTACHMENT PLUG

James E. Flood and William J. Fitzgerald, Norwich, and Charles H. Wilmot, Gales Ferry, Conn., assignors to The Plastic Wire & Cable Corporation, Jewett City, Conn., a corporation of Connecticut Application April 24, 1947, Serial No. 743,596

7 Claims. (Cl. 173—361)

This invention relates to electrical attachment plugs having prongs which are inserted in a yieldable molded body after the molding thereof, and more particularly to the method of making and assembling such plugs.

Heretofore plug bodies which were intended after molding to yield for receiving contact prongs, were molded of resilient rubber. Considering one type of plug, that not making use of a block insert, in the process of inserting the prongs, the neck portion of the resilient body was stretched or expanded, this being done either by the pull arms which are passed through the body, or by the prongs hooked on the pull arms, or by separate spreader fingers.

A difficulty of this method of assembly is that if the material of the body is made resilient enough to enable the neck portion to be readily expanded, and to prevent its tearing, the body will not be stiff enough to satisfactorily anchor the prongs and resist undesired deformation when in use. If the body material is stiffened so as to securely anchor the prongs and resist deformation, it has a tendency to resist expansion at the neck portion and to tear during the stretching of said portion, resulting in waste in manufacture and unsatisfactory product. A satisfactory compromise must be reached between the stiffness and resiliency, therefore, and this compromise, involving the ingredients of the material and conditions of molding, was difficult to attain and maintain.

An object of the present invention is to overcome the disadvantages in this prior method of making and assembling plug bodies and prongs. This is accomplished by making the plug body so as to include a thermoplastic resinous material whereby the body has the property of yielding easily or being easily deformed when heated within a certain range, and has the property of returning substantially to its original shape upon subsequent cooling, and by assembling the prongs to the plug body when the latter is in a heated state. A thermoplastic resinous material which has been found suitable for this purpose is vinyl chloride, and the plug body may be made entirely of this thermoplastic in combination with fillers, plasticizers, and pigments usually employed therewith, as required, or made partly of such combination and partly of another substance, as for example synthetic rubber of the group commonly known as Buna "N," comprising a butadiene copolymer with acrylonitrile, together with associated fillers, plasticizers, and pigments.

In accordance with this invention the molded plug bodies are heated to a temperature of between 140° F. and 180° F., preferably by induction heating and are then placed in a suitable apparatus having for instance hooks to enter the neck portion of the plug body and expand the said portion, so that the pull arms are passed through the body, pick up the plug prongs, and pull these through the body to their proper positions.

The heated plug body becomes temporarily capable of being more readily stretched without tearing, therefore the neck portion thereof readily expands without any danger of or tendency to rupture when stretched for this purpose, and upon the body being removed from the apparatus and cooling, it returns to its original molded shape and stiffened condition, securely anchoring the prongs against pull-out and otherwise resisting undesired deformation during use. The composition of the plug body and conditions of molding the body are not critical, as was the case heretofore with bodies of molded rubber and therefore the problems raised by the critical compromise referred to above are made non-existent.

When the plug bodies are made of a mixture of vinyl chloride and Buna "N" the cost of the molding material may be reduced considerably below that of vinyl chloride itself, due to the lower cost of the Buna "N," and a substantial saving may thus be effected in material, which together with the saving resulting from the elimination of scrap in the assembling operation, results in an overall economy in the product while at the same time maintaining quality.

A molded material containing thermoplastic resins, as used in the attachment plugs of this invention, has properties not found in any natural or synthetic molded rubber products which are incapable of becoming readily stretchable and of temporarily taking new shapes when moderately heated, and of automatically returning of their own accord to their original molded shapes upon cooling.

The present invention may be advantageously employed in connection with plugs wherein the prongs are inserted in a yieldable body shell together with a block insert, which latter effects an anchorage of the prongs and acts to stiffen the shell. In this type of plug the shell is stretched or expanded to receive the prongs and insert, and grips these by virtue of its contractive action. By making the shell of a thermoplastic resinous material it may be, when in a heated state, readily expanded or stretched, without danger of tearing, and after insertion of the contact prongs and block insert and upon cooling will regain its stiffness and resistance to undesired deformation, and will also contract to securely grip and retain the prongs and insert.

Other features and advantages will hereinafter appear.

In the accompanying drawings:

Figure 1 is a longitudinal section taken through a plug body made in accordance with the invention.

Fig. 2 is a longitudinal section taken on line 2—2 of Fig. 1.

Fig. 3 is a view like Fig. 1 but with the contact prongs and electric cord applied to and carried by the heated plug body, the latter not having cooled yet and the neck portion of the body still being in a stretched state.

Fig. 4 is a view like Fig. 3 but showing the plug body cooled and returned to its original molded shape.

Fig. 5 is a longitudinal section on line 5—5 of Fig. 4.

Fig. 6 is a perspective view of a contact prong, and

Fig. 7 is a sectional view like Fig. 4, but of a plug having a block insert.

The present invention is not limited to any specific form of plug but is applicable to all types of assembled electrical attachment plugs having resilient bodies.

Figs. 1 and 2 illustrate the invention as applied to an attachment plug similar to that shown in our copending application Serial No. 739,330 having a body 10 which is shown as being of generally frustro-conical shape, having a flat base 11 from which the contact prongs are to project, and having a generally tubular rear or neck portion 12 with an opening or recess 13 to admit the electric cord. Between the base 11 and neck 12 the plug body 10 is generally tapering as shown.

The body 10 is for an attachment plug of the type wherein the prongs and cord are inserted in the body through the neck thereof after the molding operation, the said neck being distorted or stretched for this purpose. Accordingly, the body 10 has a central cavity 14 communicating with the neck opening 13, the cavity 14 including generally tapered portions 15 which are coextensive with each other and are separated by a tapering central partition 16.

Adjacent the ends of the cavity portions 15 and in line therewith are recesses 17, provided in the base 11, the said recesses being separated from the cavity portions 15 by relatively thin walls or webs 18.

The recesses 17 have a cross sectional shape approximately equal to or slightly smaller than the cross section of contact prongs 19, Figs. 4, 5 and 6, which prongs are adapted to be inserted in and carried by the body 10. As shown in Fig. 6 each prong 19 may comprise a single flat metal strip having a base portion 20 adapted to be carried within the body 10, the said base portion having a notch 21 in one edge for receiving a metal conductor 22 of a lead wire 23, two such wires making up the electric cord 24 of the plug. The conductors 22 may be secured to the base portions 20 of the prongs 19 in any suitable manner, as by soldering, for example.

The base portion 20 of each prong has a pair of retainer notches 25 disposed opposite each other in opposite side edges, the said notches accommodating portions of the body wall 18 when the prongs are carried by the body, Fig. 5, thereby to securely lock the prongs and prevent pullout.

Prior to the present invention, difficulty was encountered during the assemblage of the prongs 19 in the plug body 10, due to the fact that the stretching or expansion of the neck portion 12 of the body, necessary in assemblage, caused the said portion to crack. If the plug body was made of a material which had considerable resiliency so as to prevent the cracking of the neck portion thereof, the body was not able to securely hold the prongs 19 against pull-out. If the material of the plug body was stiffened so that the prongs were securely held against pull-out, the body did not have enough resilience and cracking of the neck portion 12 would occur. This condition necessitated a close control of the molding composition for the bodies, and of the molding operation.

In accordance with the present invention the plug body 10 is made of a material containing thermoplastic resin such as vinyl chloride (Vinylite) for example, which has the property of increasing its stretchability upon being heated, and of returning to original molded shape upon cooling, and the body 10 is heated prior to its neck portion being expanded or stretched. When this is done, the insertion of the contact prongs 19 and electric cord 24 may be easily and quickly carried out, and without waste. The raising of the temperature of the plug body 10 is done preferably by placing the body in a high frequency electric field to obtain uniformity of heating, and the raised temperature may advantageously be between 140° and 180° F. Such heating enables the plug body to be readily deformed and stretched without danger of tearing, yet upon cooling the body will return substantially to its original molded shape, tightly gripping and locking in place the prongs 19 and cord 24. By this arrangement there is eliminated considerable waste in production, which was heretofore present due to tearing of the neck portions, and obviated the necessity for close control of the molding conditions and of the composition of the molding material.

A material such as vinyl chloride or a combination thereof with Buna "N" which has increased stretchability upon being heated, and which will return substantially to an original molded shape upon cooling is hereinafter referred to as a thermoelastic material.

The prongs 19 and electric cord 24 may be inserted in the body 10 in different ways and with more than one kind of apparatus, the insertion being made, as above mentioned, through the neck portion 12 of the body and being accompanied by expanding or stretching the said neck portion, as is common practice with plugs having bodies molded of resilient rubber. A common method of inserting the prongs 19 and cord 24 in the body 10 is to pass a pair of needles or pull-arms through the body, the needles entering the recesses 17 in the base 11 and piercing the walls 18 of the body, and passing through the opening 13 in the neck portion 12. The ends of the needles are usually equipped with hooks which enter apertures in the ends of the prongs, and upon the needles or pull-arms being withdrawn from the body, the prongs 19 and the electric cord 24 will be inserted and positioned in the proper place as shown in Fig. 4.

During the assemblage of the prongs 19 and cord 24 to the plug body 10 the neck portion 12 thereof may be stretched or expanded by various means, as is common practice in the art. For instance, the pull-arms which are passed through the plug body 10 may engage and expand the neck portion 12, or the expansion may be effected by the prongs 19 during the inserting movement of these in the body 10. In other cases the neck portion 12 of the body 10 may be engaged by a pair of hook-like fingers which spread it apart or expand it.

Upon the prongs 19 being inserted in the body 10 the walls 18 thereof will be further ruptured and the separated portions of the walls will occupy the notches 25 of the prongs, as shown in Fig. 5. Preferably the recesses 17 are molded in the body 10 so as to be slightly smaller than the cross sectional area of the prongs 19. When the plug body 10 is heated, the insertion of the prongs 19 is thus not hindered by the smaller size of the recesses 17 due to the ease with which the body may be stretched. However, upon the body cooling and resuming its normal molded shape, the prongs 19 will be very tightly gripped due to the contraction of the body, and this may be enhanced by the interlocking action provided by the broken-through walls 18, and results in the prongs 19 being securely anchored against pull-out.

In accordance with the invention, the plug body 10 may be formed entirely of a thermoplastic resinous composition such as Vinylite, or may be formed in part of Vinylite and in part of a substance such as synthetic rubber of the type known as Buna "N" and comprising a butadiene copolymer with acrylonitrile. We have found that, using molding compositions as outlined above, by heating the plug body 10 to a temperature of between 140° and 180° F. the material of the body will be rendered sufficiently soft to be readily stretched, while at the same time the body will not be so hot that it cannot be conveniently handled by the operator who loads it into a machine, for instance.

Immediately after the insertion of the prongs 19 and cord 24 in the body 10 and upon removal of the stretching force therefrom, the body will respond quickly by contracting to a limited extent. The approximate shape of the body when so contracted is shown in Fig. 3. Upon the body being allowed to cool it will contract further and finally assume the shape shown in Fig. 4 which is substantially identical to its original molded shape shown in Fig. 1.

By the use of a molded composition containing Buna "N" in substantial amounts the overall cost of the composition may be considerably reduced so that it approaches the cost of rubber as heretofore used. This fact, together with the elimination of waste due to cracking of the neck portions, and absence of critical control of molding operations and materials, make for a desirable economy in manufacture.

In Fig. 7 a plug made in accordance with the invention and having a block insert is illustrated. The plug shown therein comprises a body 26 having a neck portion 27 with opening 28 for receiving the electric cord 24. The body 26 has a central cavity 29 communicating with the opening 28, the central cavity extending through to the base 30 of the plug body without diminution of cross section.

The prongs 19 of the plug are positioned within the cavity 29 against opposite walls thereof, and between the prongs 19 a block insert or plug 31 is located.

In accordance with the invention the plug body 26 is molded of a composition which includes a thermoplastic resin, such as Vinylite.

In assembling the parts of the plug, the electric cord 24 is first passed through the cavity of the body from the base 30 thereof, to the neck opening 28, the body being heated so that it is in a condition wherein it may be readily stretched without danger of cracking. The prongs 19 are pulled into the body 26 by cord 24, and the plug or block 31 may be inserted either during the insertion of the prongs or subsequent to said insertion. Due to the ease with which the body 26 may be stretched or expanded, no difficulty is had with the insertion of the prongs 19 or block 31, and the said prongs and block may be the means for stretching or expanding the body 26, or separate means may be employed for such expansion, as desired.

Upon the body 26 cooling it will contract and tend to resume its original molded shape whereupon the prongs 19 and block 31 will be securely held in position. Preferably the cavity 29 of the plug body is made slightly smaller than the cross sectional area of the combined prongs 19 and block 31, thereby resulting in a continuous retaining pressure being applied on these parts.

Variations and modifications may be made within the scope of this invention and portions of the improvements may be used without others.

We claim:

1. The method of making an electric attachment plug having a body of stiff thermoelastic material of the group consisting of vinyl chloride and mixtures of vinyl chloride and Buna "N" and having conductor means comprising wires and projecting contact prongs connected thereto pulled into cavities therein, which includes the steps of molding a stiff elongate body to its ultimate exterior and interior shape, bringing the body to a temperature range in which the stretchability of the material is temporarily increased, stretching a portion of the body to enlarge the entrance of the cavities therein, pulling said conductor means through said enlarged entrance and through the body and into said body cavities, and restoring said body substantially to its original stiffness and shape by cooling the same.

2. The method of making an electric attachment plug having a body of stiff thermoelastic material of the group consisting of vinyl chloride and mixtures of vinyl chloride and Buna "N" and having conductor means comprising wires and projecting contact prongs connected thereto pulled into cavities therein, which includes the steps of molding a stiff elongate body to its ultimate exterior and interior shape, subjecting the body to a high frequency electric field to heat it to a temperature range in which the stretchability of the material is temporarily increased, stretching a portion of the body to enlarge the entrance of the cavities therein, pulling said conductor means through said enlarged entrance and into said body cavities, and restoring said body substantially to its original shape and stiffness by cooling the same.

3. The method of making an electric attachment plug having a body of stiff thermoelastic material of the group consisting of vinyl chloride and mixtures of vinyl chloride and Buna "N" and having conductor means comprising wires and contact prongs connected thereto pulled into cavities therein, which includes the steps of molding a stiff elongate body to its ultimate exterior and interior shape, bringing the body to a temperature between 140° F. and 180° F. whereby the stretchability of the material is temporarily increased, stretching a portion of the body to enlarge the entrance of the cavities therein, pulling said conductor means through said enlarged entrance and into said body cavities, and restoring said body substantially to its original shape and stiffness by cooling the same.

4. The method of making an electric attachment plug having a premolded elongate body of stiff thermoelastic material of the group consisting of vinyl chloride and mixtures of vinyl chloride and Buna "N" and having a recessed neck and a cavity therein communicating with the recess of the neck, and having conductor means comprising wires and contact prongs connected thereto and located in the cavity therein, which includes the steps of bringing the stiff body to a temperature range in which the stretchability of the material is temporarily increased, expanding the neck of the body to enlarge the recess thereof, pulling said conductor means through said enlarged recess and into said body cavity, and restoring said body substantially to its original shape and stiffness by cooling the same.

5. The method of assembling an electric attachment plug having a premolded elongate body of stiff thermoelastic material of the group consisting of vinyl chloride and mixtures of vinyl chloride and Buna "N," said body having a recessed neck and a cavity therein communicating with the recess of the neck, and having conductor means comprising wires and contact prongs connected thereto and located in the cavity therein, which includes the steps of bringing the stiff body to a temperature range in which the stretchability of the material is temporarily increased, inserting pulling means through the body and expanding the neck of the body to enlarge the recess thereof, connecting said conductor means to the pulling means and drawing the conductor means through said enlarged recess and into said body cavity, and restoring said body substantially to its original shape and stiffness by cooling the same.

6. The method of making an electric attachment plug having a body of stiff thermoelastic material of the group consisting of vinyl chloride and mixtures of vinyl chloride and Buna "N," said body having conductor means comprising wires and contact prongs connected thereto and located in cavities therein, which includes the steps of molding the elongate body to its ultimate stiffness and exterior and interior shape, bringing the body to a temperature range in which the stretchability of the material is temporarily increased, stretching a portion of the body to enlarge the entrance of the cavities therein, inserting a block insert and said conductor means through said enlarged entrance and into said body cavities, and restoring said body substantially to its original shape and stiffness by cooling the same.

7. An electric attachment plug comprising contact prongs having notches in the edges thereof, and a one-piece body of stiff thermoelastic material of the group consisting of Vinylite and mixtures of Vinylite and Buna "N" capable of being rendered temporarily stretchable by heat and restorable to original shape upon cooling, said body having cavities of a cross-section not greater than that of said contact prongs and die-formed transverse webs in said cavities having slits therein for receiving, gripping and supporting said contact prongs; and pull-in conductor means comprising wires and said contact prongs connected thereto, said means being carried in the cavities of the body with the notches on the prongs and the adjacent surfaces of the prongs engaged by the edges of the slits in the webs to be interlocked with and gripped thereby to anchor the prongs in the body when the body is cool.

JAMES E. FLOOD.
WILLIAM J. FITZGERALD.
CHARLES H. WILMOT.

REFERENCES CITED

The following references are of record in the file of this patent:

UNITED STATES PATENTS

| Number | Name | Date |
| --- | --- | --- |
| 1,721,170 | Wrighton | July 16, 1929 |
| 1,900,139 | Tregoning | Mar. 7, 1933 |
| 1,919,455 | Wilson | July 25, 1933 |
| 1,998,356 | Brown | Apr. 16, 1935 |
| 2,017,772 | Schildgen et al. | Oct. 15, 1935 |
| 2,027,962 | Currie | Jan. 14, 1936 |
| 2,168,651 | McCoy | Aug. 8, 1939 |
| 2,312,794 | Brownstein | Mar. 2, 1943 |
| 2,362,074 | Judisch | Nov. 7, 1944 |
| 2,445,537 | Schaeffer | July 20, 1948 |